Dec. 27, 1966
T. E. KIRK
3,295,122
MALFUNCTION INDICATOR FOR SEMICONDUCTOR VOLTAGE REGULATORS
Filed June 27, 1963
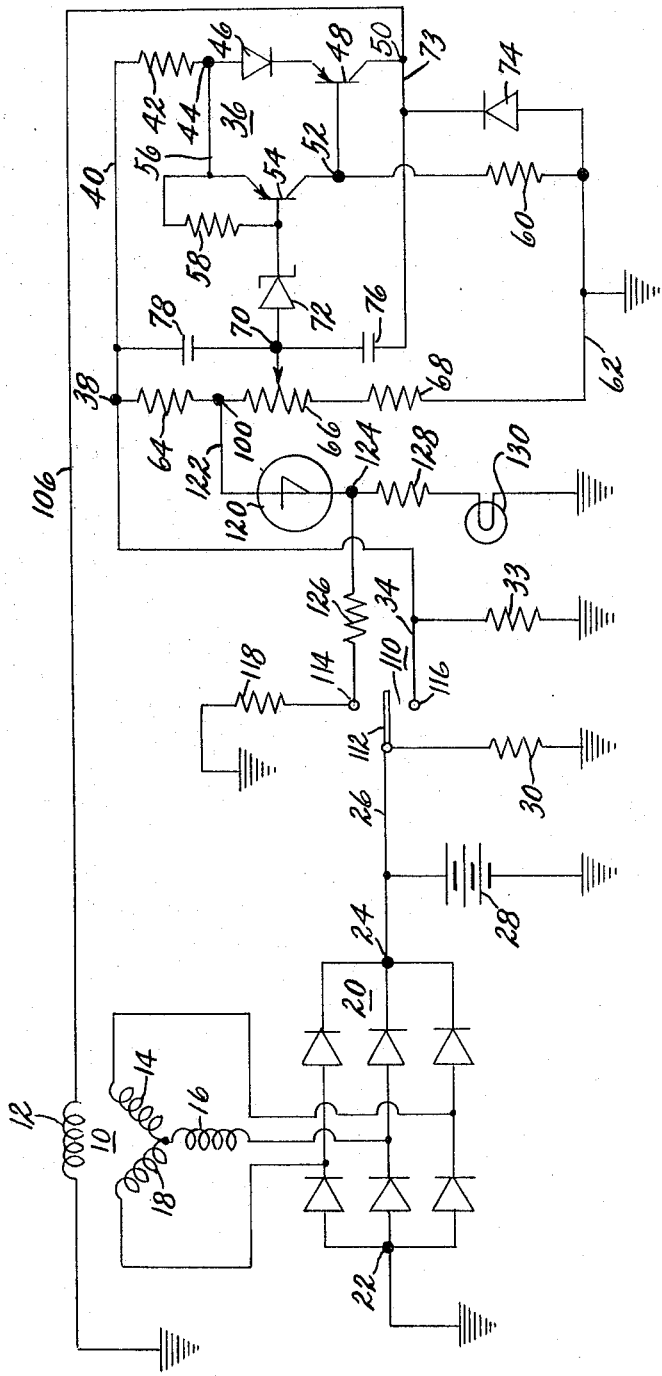
INVENTOR.
THOMAS E. KIRK
BY C. R. Meland
HIS ATTORNEY United States Patent Office 3,295,122
Patented Dec. 27, 1966

3,295,122
MALFUNCTION INDICATOR FOR SEMI-
CONDUCTOR VOLTAGE REGULATORS
Thomas E. Kirk, Anderson, Ind., assignor to General
Motors Corporation, Detroit, Mich., a corporation of
Delaware
Filed June 27, 1963, Ser. No. 291,093
2 Claims. (Cl. 340—248)

This invention relates to an electrical system and more particularly to an electrical system that is provided with means for indicating an overvoltage condition.

In motor vehicle electrical systems, it is common practice to provide a voltage regulator which maintains the output voltage of a generator at a substantially constant value. The output voltage of the generator is used to feed the electrical loads on a motor vehicle and is used to charge the storage battery. In the past, it has been common practice to use vibrating contact regulators for controlling the energization of the field of the generator and more recently, transistor voltage regulators have been used to control the field current of the generator.

The present invention is concerned with means for indicating a condition where the output voltage of the generator rises to some abnormal value.

It accordingly is an object of this invention to provide an electrical indicating system for a power supply system that will indicate a dangerous overvoltage condition.

Another object of this invention is to provide an electrical system for a motor vehicle wherein means are provided for indicating a condition where the output voltage of the generator rises to some abnormally high value which is above the desired regulated output voltage to be maintained by a voltage regulator.

A further object of this invention is to provide an overvoltage indicating system for an electrical supply system that includes a semi-conductor four layer diode connected with an electrically energizable indicating device such as a signal lamp.

Further objects and advantages of the present invention will be apparent from the following description, reference being had to the accompanying drawing wherein a preferred embodiment of the present invention is clearly shown.

In the drawing:

The single figure drawing is a schematic circuit diagram of an electrical system which is capable of indicating an abnormally high output voltage condition of the power supply generator.

Referring now to the drawing, the reference numeral 10 generally designates an alternating current generator which has a field winding 12 and a three phase Y-connected output winding comprised of phase windings 14, 16 and 18. The output winding is connected with the input terminals of a three phase full wave bridge rectifier network generally designated by reference numeral 20 and comprised of six semiconductor silicon diodes. The anodes of three diodes are connected to junction 22 which is grounded. The cathodes of the other three diodes are connected with junction 24. The junctions 24 and 22 provide positive and negative D.C. output terminals for the bridge rectifier network 20.

The generator 10, in a motor vehicle electrical system, is driven by the engine and one of the windings is rotatable with respect to the other winding. The diodes that form the bridge rectifier network can be built into the generator, if desired, or can be a separate unit. It will be appreciated by those skilled in the art that the output voltage of the generator 10 depends upon the amount of field current supplied to the field winding 12 and that the D.C. output voltage appearing between junctions 24 and 22 varies in accordance with the output voltage of the three phase output winding.

The D.C. output terminal 24 is connected with a conductor 26 which feeds the storage battery 28 and an electrical load designated by reference numeral 30. The conductor 26 is connected to one side of a manually shiftable contactor 112 which cooperates with fixed contacts 114 and 116. These components form a switch generally designated by reference numeral 110.

The electrical system of this invention is provided with a semi-conductor voltage regulator generally designated by reference numeral 36 which in this case is a transistor regulator. The regulator 36 has a positive input terminal 38 connected with conductors 34 and 40. The conductor 40 is connected with a resistor 42 the opposite side of this resistor being connected with junction 44. A diode 46 is connected between junction 44 and the emitter electrode of a PNP junction transistor 48. The collector electrode of transistor 48 is connected with junction 50 while the base electrode of this transistor is connected with a junction 52. The junction 50 is connected with conductor 106 which is connected to one side of field winding 12. The opposite side of field winding is grounded.

The transistor regulator has another PNP junction transistor designated by reference numeral 54. The emitter of transistor 54 is connected with junction 44 via conductor 56. The collector of transistor 54 is connected with junction 52. A resistor 58 connects the emitter and base electrodes of transistor 54. A resistor 60 connects the junction 52 with a grounded conductor 62.

The voltage sensing circuit for the transistor regulator is comprised of a resistor 64, a potentiometer resistor 66 and a resistor 68. This voltage dividing network is connected between junction 38 and the grounded conductor 62 as is clearly apparent from the drawing. The shiftable tap of the potentiometer resistor 66 is connected with junction 70 and it is seen that a Zener diode 72 is connected between junction 70 and the base electrode of transistor 54. A filter capacitor 78 is connected between junction 70 and conductor 40. A feedback capacitor 76 connects the collector electrode of transistor 48 with the junction 70. A transient voltage suppressing diode 74 is connected between conductors 73 and 62.

The transistor regulator is of a type shown in the Hetzler Patent, 2,945,174, and operates to cause the transistor 48 to switch on and off in its emitter-collector circuit in accordance with the output voltage of the bridge rectifier 20. In this circuit, the conduction of transistor 54 is controlled by the Zener diode 72 and this diode is connected in a circuit which senses the voltage appearing across the voltage divider 64, 66 and 68. The other elements of the circuit and their function are more fully described in the Hetzler Patent, 2,945,174, it being sufficient for this application to point out that the transistor 48 controls the amount of current flowing through the field winding 12 in accordance with the output voltage conditions of the bridge rectifier 20.

As pointed out above, the switch 110 has a movable contact 112 and a pair of fixed contacts 114 and 116. The fixed contact 114 is connected with an electrical load 118 which may be, for example, the cranking motor on a motor vehicle. The contact 114 is engaged by the movable contact 112 when it is desired to crank the engine to start the engine. The fixed contact 116 might be termed the "run" contact since it is engaged when the engine is running under normal conditions. The contact 116 is connected with conductor 34 which is connected with positive input terminal 38 of transistor regulator 36. A load 33 is connected between conductor 34 and ground.

The abnormal voltage indicating circuit shown in the drawing includes a voltage responsive semiconductor device 120 which is a four layer diode. The four layer diode 120 is PNPN semiconductor device which remains nonconductive until a prescribed voltage is applied across it whereupon it breaks down and conducts. When the voltage is lowered below its breakdown voltage it reverts back to its nonconductive condition. One side of the four layer diode 120 is connected to the junction 100 on the voltage dividing network by the conductor 122. The opposite side of the four layer diode 120 is connected with a junction 124. The contact 114 and junction 124 are connected by a resistor 126. A resistor 128 connects the junction 124 to one side of a signal lamp 130, the opposite side of this signal lamp being grounded.

When the movable contact 112 is engaging the fixed contact 116, the field winding 12 of the generator can be energized through conductor 34, junction 38, conductor 40, resistor 42, junction 44, diode 46, emitter to collector of transistor 48, junction 50, conductor 106 and through field winding 12 to ground. If a malfunction occurs in the system such as the shorting of transistor 48 which causes the field 12 to be continuously energized, the four layer diode 120 breaks down which permits current to flow through the resistor 128 and the signal lamp 130. The voltage breakdown characteristic of the four layer diode 120 is so selected that it only will break down when the voltage appearing between junction 100 and ground is an abnormally high voltage which indicates that the output voltage of the generator and the bridge rectifier is abnormally high and above the normal regulated voltage maintained by the transistor regulator 36. The breakdown of the four layer diode 120 and the resultant flow of current through the signal lamp 130 causes this signal lamp to be lit and indicates to the driver of the motor vehicle that there is a malfunction in the electrical system.

When movable contact 112 is engaging the fixed contact 114, the signal lamp will be energized through resistors 126 and 128 which forms a test circuit for the signal lamp.

While the embodiment of the present invention as herein disclosed constitutes a preferred form, it is to be understood that other forms might be adopted.

What is claimed is as follows:

1. In combination, a generator having a field winding and an output winding, a direct current output circuit energized by said output winding, a transistor voltage regulator circuit having a voltage sensing circuit arrangement and at least one transistor, first means for connecting the emitter and collector electrodes of said transistor and said field winding in series across said direct current output circuit, second means for connecting said voltage sensing circuit arrangement across said direct current output circuit, an electrically energizable indicating lamp, a four layer diode having a breakdown voltage rating of a selected value greater than the desired regulated voltage to be maintained by said voltage regulator circuit, and means for connecting at least said electrically energizable indicating lamp and said four layer diode in series across said direct current output circuit for providing a visual indication when the voltage across said direct current output circuit exceeds the voltage to be maintained by said voltage regulator circuit.

2. In combination, an alternating current generator having a field winding and a three phase output winding, a three phase full wave bridge rectifier network connected with said output winding having direct current output terminals, a direct current output circuit connected with said direct current output terminals, a transistor voltage regulating means, said transistor voltage regulating means including at least one transistor and a voltage divider network, means for connecting the emitter and collector electrodes of said transistor and said field winding in series across said direct current output circuit, means for connecting said voltage divider network across said direct current output circuit, a four layer diode, a signal lamp, and means for connecting said four layer diode and said signal lamp in series across at least a portion of said voltage divider network.

References Cited by the Examiner

UNITED STATES PATENTS

| 2,945,174 | 7/1960 | Hetzler | 323—22 |
| 3,018,356 | 1/1962 | Busch et al. | 317—33 |
| 3,022,456 | 2/1962 | Larson et al. | 320—48 |
| 3,187,225 | 6/1965 | Mayer | 317—33 |

FOREIGN PATENTS

| 1,317,074 | 12/1962 | France. |
| 1,323,673 | 3/1963 | France. |

NEIL C. READ, *Primary Examiner.*

D. K. MYER, *Assistant Examiner.*